Nov. 20, 1962 W. BESEL ETAL 3,064,797
AUTOMATIC TENSIONING DEVICE FOR CONVEYOR BELTS
Filed July 6, 1960 2 Sheets-Sheet 1

INVENTORS
Wilhelm Besel, Theo
Englert, Kurt Mayer

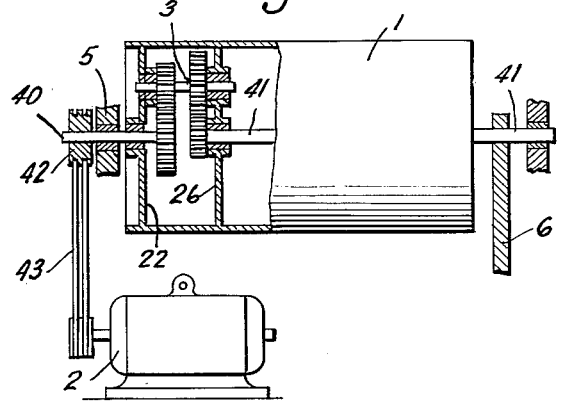
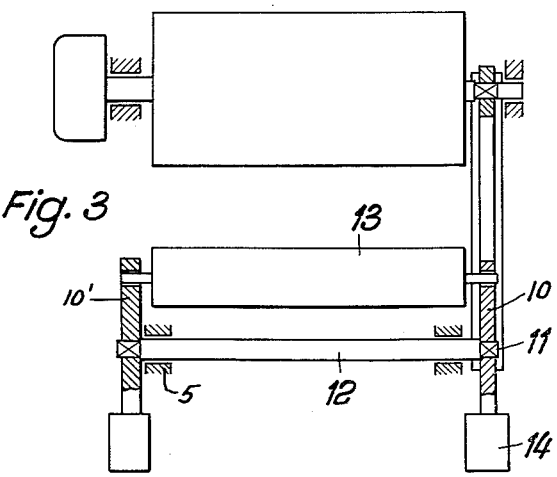

United States Patent Office 3,064,797
Patented Nov. 20, 1962

3,064,797
AUTOMATIC TENSIONING DEVICE FOR
CONVEYOR BELTS
Wilhelm Besel, Bad Homburg vor der Hohe, Theo
Englert, Darmstadt-Eberstadt, and Kurt Mayer, Darmstadt, Germany
Filed July 6, 1960, Ser. No. 41,174
5 Claims. (Cl. 198—208)

The present invention relates to an automatic tensioning device for endless conveyors, in particular for conveyor belts, in which a tensioning roller is connected by gears with the driving roller and its position is adjusted by the reaction to the driving moment of a motor.

In known tensioning means for belt drives a belt is tensioned in response to the power or load to be transmitted. The stator of the driving motor is swingingly supported, so that the reaction to the driving moment results in pivoting of the motor and tensioning of the belt.

In the tensioning device according to this invention pivotable tensioning roller is connected with a link which is joined to a crank actuated by reaction to the driving moment.

This tensioning device consists of only a few parts which can be easily constructed. It is applicable to endless conveyors of different type. It may later be mounted on existing conveyors without substantial alterations and without occupying additional space.

The operation of the device is so simple and it can be so easily controlled that special instructions for the operator are not required. Adjustment of the belt tension is equally simple.

In the drawing there are illustrated three embodiments of the invention. In the drawing:

FIGURE 3 is a top view of the apparatus of FIGURE 2, without the conveyor belt.

FIGURE 4 shows a modified driving roller with built in gear and separately arranged motor in an elevational view, with portions of the roller broken away.

Figure 1:
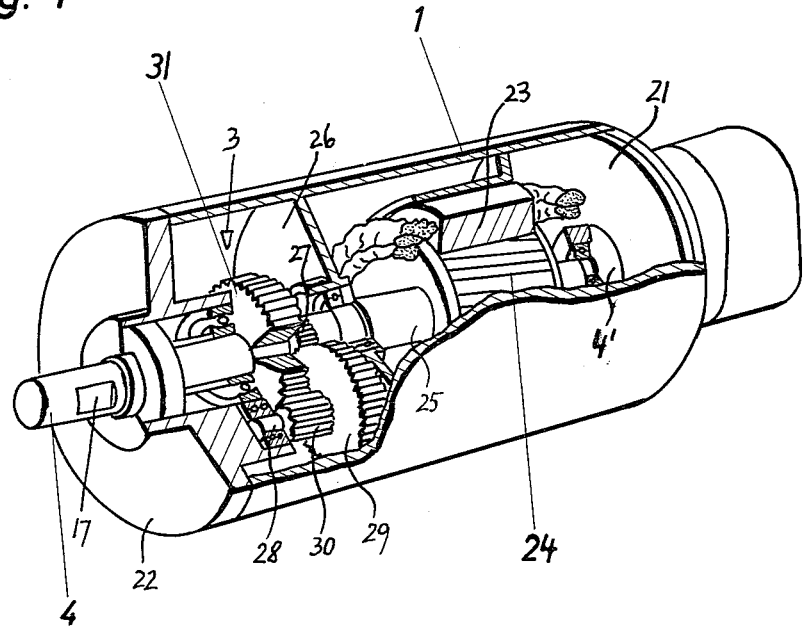
FIGURE 1 is a perspective view of driving roller of the invention for a conveyor belt, the driving roller being partly broken away to reveal a built in motor and gear.
Figure 2:
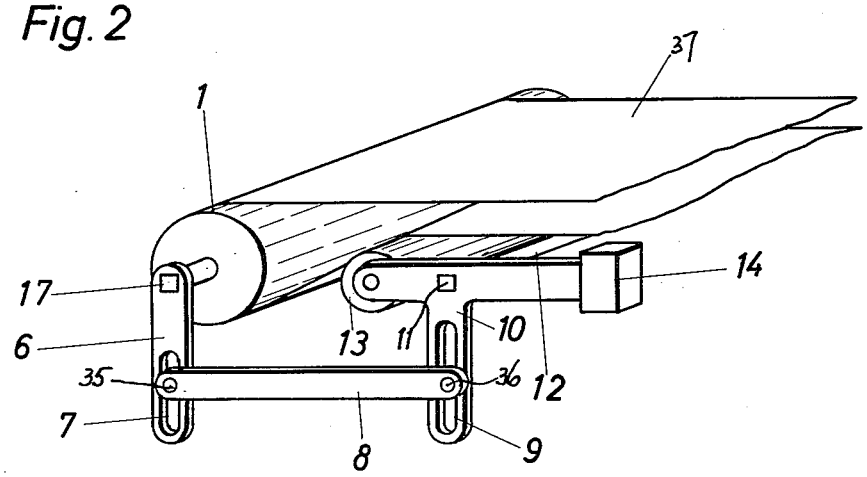
FIGURE 2 is a fragmentary perspective view of a belt conveyor equipped with the roller of FIGURE 1.

As seen in FIGS. 1 to 3 the driving roller 1 of the conveyor is mounted on two stub shafts 4 and 4'. The stub shaft is fixedly fastened to a radial end wall 21 of the hollow roller 1, whereas the stub shaft 4 is rotatable in the other end wall 22. Both stub shafts are journaled in the frame of the conveyor which has been omitted from FIG. 1 for the sake of clarity.

The stator 23 of an electric motor is mounted on the internal wall of the hollow roller 1. The corresponding rotor 24 is fastened on a drive shaft 25 one end of which rotatably engages an axial recess in the stub shaft 4'. The other end of the drive shaft 25 passes through a partition 26 in the roller 1 and carries a spur gear 27.

The spur gear 27 is an element of a planetary gear train 3 which connects the drive shaft 25 with the roller 1 and the stub shaft 4. A planet shaft 28 has an axis parallel to the common axis of the stub shafts 4, 4' and of the drive shaft 25, but is radially offset therefrom. The planet shaft 28 carries two fixedly connected spur gears 29 and 30 which respectively mesh with the gear 27 on the drive shaft 25 and a gear 31 on the stub shaft 4.

The stub shaft 4 has a non-cylindrical portion 17 on which a radially elongated arm 6 is mounted. A pin 35 having an axis parallel to that of the roller 1 is radially adjustable in a longitudinal slot 7 of the arm 6, and hingedly carries one end of a link 8. The other end of the link is hinged to a first arm of a bell crank lever 10 by means of a pin 36 which is radially adjustable relative to the axis of rotation of the lever 10 in a slot 9 of the lever arm.

The lever 10 is secured against rotation on one end 11 of a shaft 12 which is rotatable in the conveyor frame 5 about an axis parallel to that of the roller 1, and the other end of which carries another bell crank lever 10' similar to the lever 10.

A tensioning roller 13 is rotatably mounted between respective second arms of the levers 10, 10' and is balanced by counterweights 14 mounted on the levers 10, 10'. A conveyor belt 37 is trained over the driving roller 1 and the tensioning roller 13 in a conventional manner.

The aforedescribed apparatus operates as follows:

Let it be assumed that the electric motor be initially shut off and that the conveyor belt 37 be slack. When the motor is energized, the rotor 24 together with drive shaft 25 rotates clockwise as viewed in FIGS. 1 and 2. The stator 23, the roller 1, and the belt 37 remain initially stationary because of their greater combined inertia and frictional load.

Rotation of the drive shaft 25 actuates counterclockwise rotation of the planet shaft 28 by the meshing gears 27, 29. This movement is transmitted to the stub shaft 4 by the meshing gears 30, 31, and the levers 10, 10' are pivoted clockwise whereby the belt 37 is tensioned by the tensioning roller 13. As further movement of the stub shaft 4 is resisted and eventually prevented by the resilient force of the belt 37, the rotary movement of the gear 30 about its axis is stopped, and the planet shaft 28 with the gears mounted thereon rotates counterclockwise as a unit with the roller 1 about the gear 27 as the latter is rotated by the electric motor.

The drive arrangement illustrated thus maintains the belt 37 under tension while it is driven. When the motor is deenergized, the belt is permitted to sag and thereby to pivot the tensioning roller 13 counterclockwise. The condition initially assumed is restored.

The tension to which the belt is subjected during operation of the apparatus may be adjusted by radially shifting the pins 35 and 36 in their respective slots 7, 9.

The modified embodiment of the invention illustrated in FIG. 4 differs from the driving roller arrangement shown in FIGS. 1 to 3 mainly by the provision of an electric motor 2 which is mounted on the machine frame 5 outside the roller 1. The roller is journaled on an axially split shaft 40, 41. One shaft portion 40 is rotatably supported in bearings in the machine frame 5 and in the end wall 22. It carries a pulley 42 driven by the motor 2 by means of a belt 43. The shaft portion 40 is the input shaft of the planetary gear train 3 of the roller 1 which is the structural and functional equivalent of the gear train described in connection wtih FIG. 1.

The shaft portion 41 which constitutes an output shaft of the gear train 3 is journaled in respective bearings in the partition 26, an end wall of the roller 1 (not visible in FIG. 4), and the conveyor frame 5. A radial arm 6 is secured on the shaft portion 41 against rotation.

The apparatus shown in FIG. 4 operates in the same manner as that illustrated in FIGS. 1 to 3 so that a more detailed description is unnecessary.

What we claim is:

1. In a drive arrangement, in combination driving roller means; belt means trained over said roller means; tensioning roller means engaging said belt means and movable for tensioning the same; planetary gearing including first and second coaxially rotatable shafts, a third rotatable shaft having an axis radially offset from the common axis of said first and second shafts, said third shaft being mounted for revolution of the axis thereof about said common axis, said second and third shafts constituting a pair of shafts, respective gear means on each of said shafts, the gear means on said third shaft simultaneously engaging the gear means on said first and second shafts; motor means for actuating rotation of said first shaft; and two motion transmitting means respectively interposed between one shaft of said pair of shafts, and one of said roller means for rotating said driving roller means and for tensioning said belt means when said motor means actuates rotation of said first shaft.

2. In a drive arrangement as set forth in claim 1, said driving roller means being rotatable about said common axis.

3. In a drive arrangement as set forth in claim 2, said motor means including two elements arranged for rotation relative to each other about said common axis when said motor means is energized, said elements being respectively connected to said driving roller means and to said first shaft.

4. In a drive arrangement as set forth in claim 2, said driving roller means being connected to said third shaft by one of said motion transmitting means for joint revolution therewith about said common axis, and said tensioning roller means being connected to said second shaft by the other motion transmitting means for tensioning said belt when said motor means is energized.

5. In a drive arrangement as set forth in claim 1, said motor means including two elements arranged for rotation relative to each other when said motor means is energized, said elements being respectively connected to said first shaft and to said third shaft for actuating revolution of said third shaft about said common axis.

References Cited in the file of this patent
UNITED STATES PATENTS
2,797,075   Wilbur _____ June 25, 1957